United States Patent [19]
Röhrbein

[11] Patent Number: 4,708,565
[45] Date of Patent: Nov. 24, 1987

[54] DEVICE FOR STACKING RECTANGULAR BALES OF STALKY MATERIAL

[75] Inventor: Jürgen Röhrbein, Vechelde-Wahle, Fed. Rep. of Germany

[73] Assignee: Gebrüder Welger GmbH & Co. Kommanditgesellschaft, Wolfenbüttel, Fed. Rep. of Germany

[21] Appl. No.: 731,503

[22] Filed: May 7, 1985

[30] Foreign Application Priority Data

May 8, 1984 [DE] Fed. Rep. of Germany ....... 3416907

[51] Int. Cl.⁴ ...................... A01F 15/18; B65G 57/20
[52] U.S. Cl. ....................................... 414/86; 414/100
[58] Field of Search ............. 100/188 R, 180; 56/449; 414/86, 100, 111, 97, 98

[56] References Cited

U.S. PATENT DOCUMENTS

| | | | |
|---|---|---|---|
| 1,378,709 | 5/1921 | Martin | 40/158 B |
| 1,544,139 | 6/1925 | Duclos | 40/158 B |
| 2,531,560 | 11/1950 | De Wall | 298/20 R |
| 2,842,882 | 7/1958 | Greene et al. | 40/158 B |
| 3,214,083 | 10/1965 | Jory | 229/69 |
| 3,400,807 | 9/1968 | Nickla et al. | 198/624 X |
| 3,443,708 | 5/1969 | Blair | 414/86 X |
| 3,484,097 | 12/1969 | Jory | 270/52 |
| 3,756,428 | 9/1973 | White | 414/57 X |
| 3,877,584 | 4/1975 | Holcombe | 414/98 X |
| 3,942,429 | 3/1976 | Schmalz et al. | 100/188 R X |

FOREIGN PATENT DOCUMENTS

| | | | |
|---|---|---|---|
| 2656918 | 6/1978 | Fed. Rep. of Germany | 40/158 B |
| 602352 | 12/1976 | Switzerland | 270/52 |
| 373887 | 6/1932 | United Kingdom | 40/124.4 |

Primary Examiner—Frank E. Werner
Assistant Examiner—Janice Krizek
Attorney, Agent, or Firm—Toren, McGeady & Associates

[57] ABSTRACT

A device for stacking rectangular bales of stalky material connected directly at the compression duct of a baling press consists of a horizontal platform supported to be displaceable in vertical guides and capable of being lowered from an uppermost position in several stages corresponding to the height of a bale to be stacked. The lowering stages are determined by mechanical pawls and the lowering movement is triggered automatically by a bale when reaching its end position via a bale sensing device. In order that entwining of material at the point of separation between adjoining bales of stalky material does not disturb the lowering movement, a forward bale is forcefully separated from a succeeding bale before lowering by additional forward feed elements controlled by bale sensing devices.

10 Claims, 4 Drawing Figures

DEVICE FOR STACKING RECTANGULAR BALES OF STALKY MATERIAL

The present invention is directed to stacking apparatus for rectangular bales of stalky material, which is arranged downstream of the horizontal compression duct of a baling press.

The apparatus is of the type consisting of a horizontal platform supported at both sides in vertical guides which, in an uppermost position, connects at or adjoins a compression duct floor in the plane of the compression duct floor. After loading a bale of stalky material thereon, the platform can be lowered from the uppermost position in several stages corresponding to the height of the bale, so that several bales of stalky material can be stacked one on top of another on the platform.

Apparatus of the type herein described is known, wherein a bale of stalky material is first loaded on a platform located in an uppermost position in the plane of a compression duct floor. When the bale has reached the desired position on the platform, locking of the platform is released and the platform moves downwardly by one stage corresponding to the height of the bale as a result of the inherent weight of the bale and the weight of the platform. Relatively good stacking results are achieved with this apparatus. However, it has been shown that with certain materials or moisture contents, an entwining and an adhering of the material can occur at the separating point between the bale still located in the compression duct and the bale to be lowered, located on the platform, to such an extent that a separation of the two bales is impeded. However, a complete, unimpeded separation of the bales is required for secure lowering of the platform to the respective stage, which ensures a loading of the bales one on top of another without delay. If, in an unfavorable instance, the bale to be lowered does not disengage completely from the following bale, the following bale pushes the forward bale off the platform from the rear thereof instead of being pushed on top of or over the forward bale. If the bale to be lowered does not disengage promptly, i.e., exactly as the lowering movement of the platform begins, from the following bale, a steplike stack then results because of the misalignment of the individual bales loaded on top of each other, which stack must be aligned subsequently by additional operational processes.

SUMMARY OF THE INVENTION

The invention is directed toward improving a stacking device of the type described so that the lowering movement of the platform required for stacking the bales on top of one another is effected independently from the bales of stalky material still located in the compression duct, so that bales of stalky material can be securely stacked regardless of the moisture and type of stalky material and so that the individual bales of stalky material will lie on top of one another in the stack so as to cover one another as uniformly as possible.

Briefly, the present invention may be described as an apparatus and method for stacking rectangular bales of stalky material, wherein the stacking device comprising the apparatus of the invention is arranged downstream from the compression duct floor of a baling press. The stacking device consists of a horizontal platform which is supported at both sides thereof in vertical guide members with the platform being movable vertically between an uppermost position, which coincides with the plane of the compression duct floor, and so that it can be lowered from said uppermost position after loading thereon of a bale of stalky material in several stages corresponding to the height of a bale. Thus, several bales of stalky material may be stacked one on top of another on the platform and the invention is particularly characterized in that the forward bales of stalky material are pushed away from the compression duct in a forced or driven manner and are separated from a succeeding or following bale which may be still located in the compression duct before or at the same time as the lowering of the platform is performed. The apparatus includes drivable forward feed elements which act on the bales of stalky material, with these forward feed elements comprising, in a preferred embodiment of the invention, vertically arranged rollers which laterally engage the bale of the stalky material and which are rotatably arranged above the compression duct floor. The vertically arranged rollers comprise radially extending cleats which engage the bales and they are mechanically arranged so as to initially free-wheel and subsequently be engaged so as to be driven in response to sensing of the position of the bales of stalky material.

Thus, according to the invention, the separation of the bales of stalky material is effected in a controlled manner by means of additional forces acting on the bale located outside the compression duct independently from weight forces. Entwining of material at the separating point between the bale to be lowered and the bale which is still located in the compression duct are disengaged in this way and a secure lowering of the respective bale of stalky material without delay into the next stage at the same time as the platform is achieved. Accordingly, continuous formation of a rectangular bale stalk is ensured.

Another advantage derived particularly in a preferred embodiment of the invention consists in that the bale of stalky material will no longer be advanced into its final position exclusively by the compressed material following it, which can result in nonuniform operation when different portions of material are fed. Rather, the bale of stalky material is always brought into its desired final position with uniform speed, independently of the following bale. An exact stack formation is additionally achieved as a result.

In accordance with a further embodiment of the invention, a simple and inexpensive construction may be provided wherein a wedge-shaped gap occurring between the bales may also facilitate disengagement of the material thereof.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
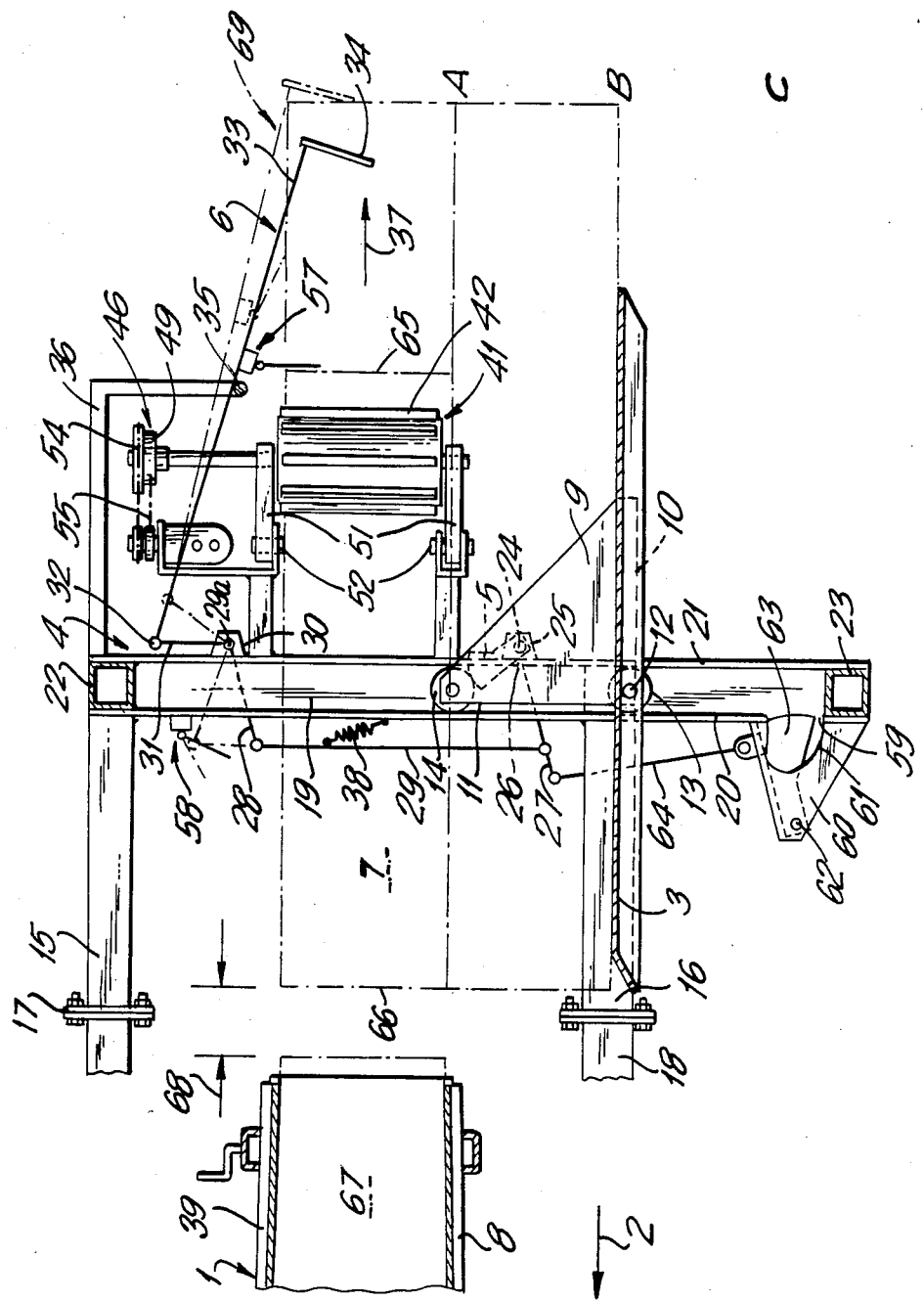
FIG. 1 is a schematic side elevation of a stacking device in accordance with the invention showing the middle position of the platform during loading of a bale of stalky material.
Figure 2:
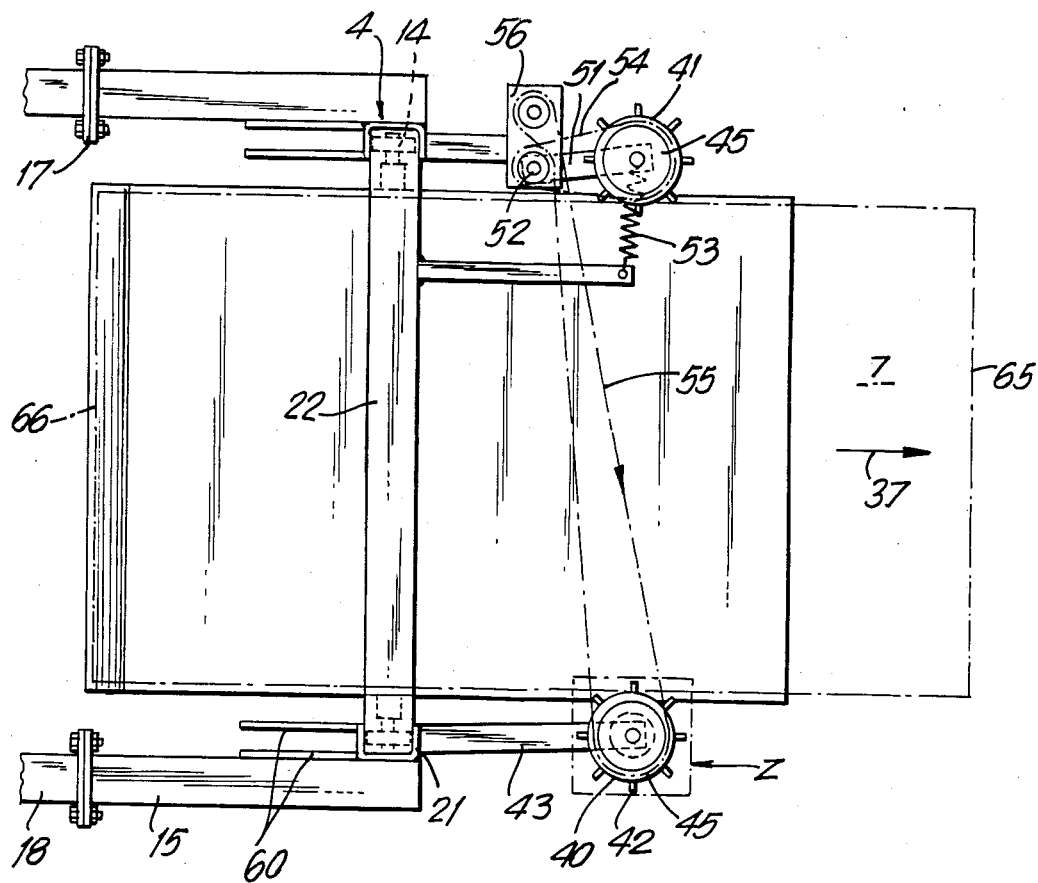
FIG. 2 is a simplified top view of the stacking device shown in FIG. 1, wherein the construction of the forward feed element is shown.
Figure 3:
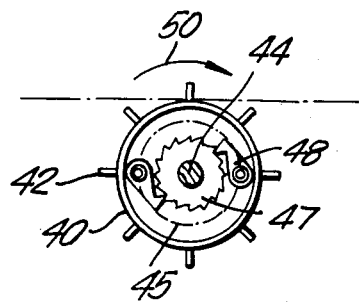
FIG. 3 is a detail Z from FIG. 2 on an enlarged scale.

Referring now to the drawings and particularly to FIGS. 1–3, wherein there is depicted a first embodiment of the invention, there is shown a stacking device for stacking rectangular bale 7 with stalky material. The stacking device is arranged directly downstream of a compression duct 1 of a baling press (not shown in more detail) and is moved in a traveling direction 2. It consists substantially of a horizontal platform 3 which is displaceably supported in vertical guides 4 and can be lowered from an uppermost position A in several stages corresponding to the bale height. The lowering stages are determined by means of mechanical pawls 5 and the lowering movement is triggered via a bale sensing device 6 which is actuated by a bale 7 when its end position is reached.

In its uppermost position A, the platform 3 connects to a compression duct floor 8 and extends toward the rear in the compression duct floor plane. The width of the platform 3 corresponds approximately to the compression duct width, while the length is dimensioned so as to be shorter than a bale length. The front free platform end is bent or folded diagonally downwardly and the lateral ends are canted or beveled downwardly by 90°.

Approximately within the area of the midpoint of the platform 3, a triangular carrying plate 9 is arranged on each side of the platform. One triangle side 10 is welded on at the lateral chamfer of the platform 3 and the other triangle side 11 extends upward from the platform 3 in the area of the guides 4 by somewhat more than a bale height. At the apex of the right triangle form, an outwardly projecting trunnion 12 is fastened at the carrying plate 9 so that it forms a bearing for a lower running roller 13. Spaced a distance above it corresponding to the bale height, a second, upper running roller 14 is arranged in the same manner. The platform 3 is supported in the guides 4 by means of these running rollers 13, 14.

The vertical guides 4 are carried on the two sides outside the platform width, in each instance, by two horizontal base frame parts 15, 16, which are connected directly with the chassis or undercarriage 18 of the baling press via a detachable connection 17. The guides 4 each consist of a continuous U-beam 19 whose legs 20, 21 face toward the platform 3. The legs 20, 21 form the running surfaces for the running rollers 13, 14. Both U-beam rails 19 are, in each instance, connected at the lower and upper end by means of a transverse tie bar 22, 23, and, at the same time, forms the lower boundary for the lowest position C of the platform 3. The uppermost position A of the platform 3 is upwardly defined on both sides by means of a stop (not shown).

In the uppermost position A, the platform 3 is held in the two lateral guides 4, in each instance, by a pawl 5. The pawl 5 engages in the running roller path by means of a recess in the rear side 21 of the U-beam 19 and supports the upper running roller 14 of the platform 3 with its rounded upper side. The pawl 5 is rotatably supported in a bracket 25 with a pin 24, which bracket 25 is fastened at the rear side 21. The lower edge 26 of the recess forms a stop for the swiveling movement of the pawl 5 in the running roller area. A lower arm 27, which extends horizontally, is fastened outside at the pawl 5. An upper arm 28 is arranged parallel to it above the bale 7. Both arms 27, 28 are connected by means of a coupling rod 29. Two upper arms 28 are provided, connected so as to be nonrotatable relative to one another by means of a transverse rod 29a extending between the guides 4 and supported in a bracket 30 at the rear side 21. Approximately in the middle of the platform, an upwardly directed lever 31, which is connected in an articulated manner with the bale sensing device 6 at the upper end via a peg 32, is fastened at the transverse rod 29a.

The bale sensing device 6 consists of a bar 33 which projects out toward the rear over the free end of the platform and which carries a stop 34 at the free end, which stop 34 is directed downward by approximately half the height of the bale. The bale sensing device 6 rests on a cross-strut 35, which extends between lateral frame parts 36, and is arranged in such a way that, after leaving the compression duct 1, a bale 7 pushed onto the platform 3 in the loading direction 37 strikes against the stop 34 and disengages the pawl 5 from the running roller 13 and 14, respectively. A spring 38, which is tensioned between guide 4 and coupling rod 29, holds the pawls 5 in the stop position and the bale sensing device 6 in the front position.

A vertical roller 40, 41 having carrier projections or cleats 42 is arranged, in each instance, between the compression duct floor 8 and a compression duct ceiling 39 outside of the platform width, behind the side of the guide 4 remote from the compression duct 1. On the left side of the stacking device, as seen in the traveling direction 2, the roller 40 is rotatably supported above and below in horizontal carrying arms 43 which are welded on at the rear side 21 of the guide 4. The roller 40 is arranged in such a way that the cleats 42 engage in the side of an arriving bale 7 of stalky material. The upper axle journal 44 penetrates the upper carrying arm or bracket 43 and, at its end, carries a chain wheel 45 which is rotatably supported on the axle journal and which cooperates with an intermediately arranged pawl ratchet mechanism 46. The ratchet wheel 47 of the pawl ratchet mechanism 46 is likewise rotatably supported on the axle journal 44, but is securely connected with the chain wheel 45. The pawls 48 are supported on a carrying plate 49 (FIG. 1) so as to be capable of swivel movement, the carrying plate 49 being fastened on the axle journal 44 so as to be nonrotatable relative thereto.

The arrangement is selected in such a way that it is possible for the roller 40 to rotate freely in the rotational direction 50 when the chain wheel 45 is stationary, whereas, when the chain wheel 45 is driven and the roller 40 is stationary, the locking wheel 47 carries along the pawls 48 and, accordingly, the roller 40, in the same direction 50. The roller 41 on the opposite side coincides in design and construction with the roller 40, but, in contrast thereto, the roller 41 swivels around vertical rotational axis 52 at the swiveled carrying arms 51. A spring 53, which is tensioned between the transverse tie bar 22 and the carrying arm 51, draws the roller 41 into a position located within the forward feed path of the bale.

By means of this movable arrangement of the roller 41, the clearance distance between the rollers 40, 41 is variable within limits and the rollers adjust themselves to irregularities in the bale width. A chain drive 54, 55 is looped around each of the chain wheels 45 of the rollers 40, 41, which chain drive 54, 55 is synchronously driven via a hydraulic motor 56 in such a way that the velocity vector at the contact point between the bale 7 and the roller 40, 41 is directed, in each instance, in the loading direction 37. The operation of the rollers 40, 41 and the drive of the hydraulic motor 56, respectively, is switched on by means of a terminal switch 57 at the bale sensing device 6 and is switched off by means of an end switch 58 which cooperates with the pawl linkage 28.

The lower end of each U-beam 19 has a recess 59 in the legs 20 which is larger than the diameter of the running roller 13. A triangular bracket 60 arranged in front of the recess 59 at the side of legs 20 has a cutout portion 61 which extends forwardly in traveling direction 2 and which connects exactly at the recess 59. A curved cam segment 63, which is swivelably supported in the tip of the bracket 60 at a peg 62, is connected with the front end of the lower arm 27 by means of a coupling rod 64. In the idle position, the curved segment 63 covers the cutout portion 61 under the influence of the spring 38. By actuating the bale sensing device 6, the curved segment 63 swivels out of the cutout portion 61. In the lowest position C of the platform 3, the lower running roller 13 can slide into the cutout portion 61 as soon as the last bale to be stacked has actuated the bale sensing device 6.

The movement of the platform 3 from its lowest horizontal position C to its uppermost position A is effected via a working ram or cylinder (not shown). The outward travel of the working cylinder can be triggered, for example, via end switches, as soon as the platform 3 moves back out of the diagonal position for unloading into its horizontal position C.

During operation of the apparatus, an individual bale 7 is moved from the baling press in the loading direction 37 toward a bale which is already located on the platform 3. When the bale 7 comes in contact with the rollers 40, 41, the bale then rotates the rollers in the direction of arrow 50, wherein the pawl ratchet mechanism 46 acts as a free-wheel. As soon as the front bale edge 65 in the direction 37 comes in contact with the end switch 57, the rollers 40, 41 are driven in the direction of arrow 50 and the bale 7 moves forward at an accelerated pace. In so doing, the rear bale edge 66 is broken loose from the following or succeeding bale 67 still located in the compression duct 1, wherein a distance or spacing 68 appears between the two bales 7, 67.

Shortly before reaching the bale end position, the bale edge 65 of the upper bale impacts against the stop 34 of the bale sensing device 6 which moves into its position 69, shown in dash-dot lines. In so doing, the arm 28 actuates the end switch 58 by means of which the roller drive is switched off and the pawls 5 are unlocked.

The bale 7 is lowered one stage to position C at the same time as the platform 3. Thereupon, the next bale 67 is pushed or loaded onto the bale 7 and is moved against the bale sensing device 6 in the same manner as described above. The bale sensing device 6 swivels the curved segment 63 out of the cutout portion 61 so that the platform 3 tilts in a diagonal position. The lower bale edge 65 of the lowest bale projecting over the rear free end of the platform contacts the ground and, during forward movement of the stacking device, the platform 3 is pulled away under the bale stack which now rests on the ground.

Figure 4:
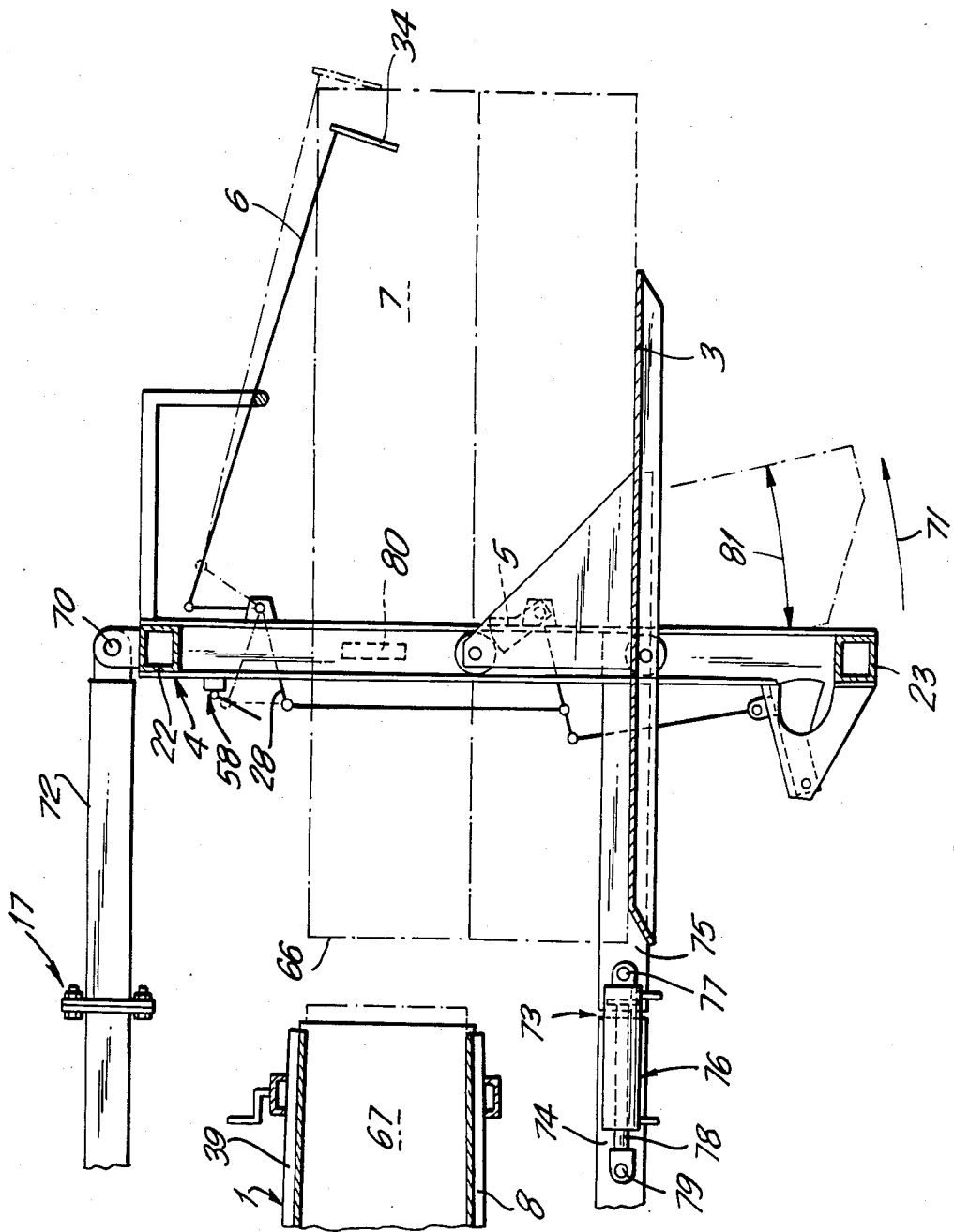
FIG. 4 is a schematic side elevation showing a modified embodiment of the invention in the middle position of the platform.

In the construction of a stacking device, shown in FIG. 4, although rollers may be provided, no rollers are necessary. The guides 4, including the platform 3, are articulated at the upper base frame part 72 so as to swivel around an upper rotational point 70 in the direction of arrow 71. The lower base frame part 73 is constructed in two parts and consists of a frame part 74, fastened at the press side, and a frame part 75 fastened, in each instance, on the guides 4. The two frame parts 74, 75 are coupled by means of a double-acting hydraulic cylinder 76 which is supported on a pin 77 at the frame part 75, while the piston rod 78 is articulated at the frame part on a pin 79. Approximately midway between the compression duct floor 8 and the compression duct ceiling 39, there are arranged controlled bale retainers 80, which are attached to the guides 4. The bale retainers 80 are engaged with the bale during movement of the platform 3 in the direction of arrow 71 and are disengaged during lowering of the bale 7.

An individual bale 7 coming out of the compression duct 1 impacts against the stop 34 of the bale sensing device 6 and deflects the latter. In so doing, the upper arm 28 actuates the end switch 58 which allows the bale retainers 80 to pierce the bale 7 and the piston rod 78 to travel out of the hydraulic cylinder 76. In so doing, the platform 3 with the guides 4 is deflected around an angle 81 in the direction of arrow 71 and the bale edge 66 is broken loose from the bale 67 located in the compression duct 1. Only when a determined swivel angle 81 is reached are the pawls 5 released and the retainers 80 swiveled out of the bale 7, so that the bale 7 is lowered one stage with the platform 3.

The platform 3 is now swiveled again into its horizontal position in which the frame parts 74, 75 lie against one another. The wedge-shaped spacing appearing between the bales 7, 67 during the swiveling movement in the direction of arrow 71 facilitates the breaking loose of the bale 7. The unloading of a bale stack is effected analogously to that shown in FIG. 1.

While specific embodiments of the invention have been shown and described in detail to illustrate the application of the inventive principles, it will be understood that the invention may be embodied otherwise without departing from such principles.

What is claimed is:

1. Apparatus for stacking rectangular bales of stalky material cooperatively arranged downstream of a compression duct of a bailing press, said compression duct having a discharge end defining a compression duct floor lying in a generally horizontal plane, comprising: a horizontal platform located directly adjacent said discharge end of said compression duct; vertical guide members supporting said horizontal platform at two sides thereof; means for moving said horizontal platform vertically between an uppermost position and a plurality of positions therebelow, said uppermost position of said horizontal platform being in said horizontal plane of said compression duct floor; said platform operating to receive from said compression duct bales of stalky material and after loading thereon of a bale of stalky material being lowered from said uppermost position in a plurality of stages corresponding to the height of said bale so that a plurality of said bales of stalky material can be stacked one atop another on said platform; and drivable forward feed elements acting on said bales of stalky material emitted from said compression duct onto said platform to separate each of said bales from a succeeding bale still located in said compression duct before or at the same time said platform is lowered.

2. Apparatus for stacking rectangular bales of stalky material cooperatively arranged downstream of a compression duct of a baling press, said compression duct having a compression duct floor lying in a generally horizontal plane, comprising: a horizontal platform; vertical guide members supporting said horizontal platform at two sides thereof; means for moving said horizontal platform vertically between an uppermost position and a plurality of positions therebelow, said uppermost position of said horizontal platform being in said horizontal plane of said compression duct floor; said platform operating to receive from said compression duct bales of stalky material and after loading thereon of a bale of stalky material being lowered from said uppermost position in a plurality of stages corresponding to the height of said bale so that a plurality of said bales of stalky material can be stacked one atop another on said platform; and drivable forward feed elements acting on said bales of stalky material emitted from said compression duct onto said platform to separate each of said bales from a succeeding bale still located in said compression duct before or at the same time said platform is lowered, said drivable forward feed elements comprising vertically arranged rollers having engagement elements thereon which operate as forward feed elements, said rollers laterally engaging said bales of stalky material and being rotatably arranged above said plane of said compression duct floor between the outlet of said compression duct and an end of said horizontal platform in an area approximately at the midpoint of said platform.

3. Apparatus according to claim 2, comprising a frame wherein said vertically arranged rollers are mounted in bearings connected to said frame.

4. Apparatus aooording to claim 2, wherein said rollers have a vertical length approximately equal to the height of said bales, wherein said rollers comprise at least one roller pair having a roller arranged on each side of said platform with said roller pair being driven in a synchronous manner, said apparatus further comprising a pawl ratchet mechanism connected in a drive mechanism of each of said rollers in such a manner that each of said rollers operates as a free-wheeling device during rotation of said roller by means of forward feed of said bales of stalky material while a driving connection between said rollers and said drive mechanism is maintained in order to advance said bales of stalky material.

5. Apparatus according to claim 2, wherein said bales are moved in a loading direction onto said platform, said forward feed elements being driven at a speed greater than the speed of said bales moved in said loading direction from said compression duct and wherein the operation of said forward feed elements is controlled depending upon the position in said loading direction of said bales of stalky material.

6. Apparatus according to claim 2, further comprising means for setting said forward feed elements in operation in response to movement of said bales exiting from said compression duct and wherein said forward feed elements are taken out of operation before lowering of said platform.

7. Apparatus for stacking rectangular bales of stalky material cooperatively arranged downstream of a compression duct of a baling press, said compression duct having a compression duct floor lying in a generally horizontal plane, comprising: a horizontal platform; vertical guide members supporting said horizontal platform at two sides thereof; means for moving said horizontal platform vertically between an uppermost position and a plurality of positions therebelow, said uppermost position of said horizontal platform being in said horizontal plane of said compression duct floor; said platform operating to receive from said compresssion duct bales of stalky material and after loading thereon of a bale of stalky material being lowered from said uppermost position in a plurality of stages corresponding to the height of said bale so that a plurality of said bales of stalky material can be stacked one atop another on said platform; and drivable forwarad feed elements acting on said bales of stalky material emitted from said compression duct onto said platform to separate each of said bales from a succeeding bale still located in said compression duct before or at the same time said platform is lowered; said horizontal platform with said bales of stalky material thereon being movable with a component of motion in a loading direction of said bales onto said platform away from said compression duct by a separation distance in order to separate bales on said platform from bales upstream thereof and being movable back to a horizontal position of said platform after lowering thereof.

8. Apparatus for stacking rectangular bales of stalky material cooperatively arranged downstream of a compression duct of a baling press, said compression duct having a compression duct floor lying in a generally horizontal plane, comprising: a horizontal platform; vertical guide members supporting said horizontal platform at two sides thereof; means for moving said horizontal platform vertically between an uppermost position and a plurality of positions therebelow, said uppermost position of said horizontal platform being in said horizontal plane of said compression duct floor; said platform operating to receive from said compression duct bales of stalky material and after loading thereon of a bale of stalky material being lowered from said uppermost position in a plurality of stages corresponding to the height of said bale so that a plurality of said bales of stalky material can be stacked one atop another on said platform; and bale retainer means acting on said bales of stalky material emitted from said compression duct onto said platform to separate each of said bales from a succeeding bale still located in said compression duct before or at the same time said platform is lowered, wherein said bales of stalky material are moved from said compression duct in a loading direction, said apparatus further comprising pivoting drive means for deflecting said platform about an upper rotational axis from a horizontal position through a swiveling angle in order to effect separation of said bales.

9. Apparatus according to claim 8, wherein said bale retainer means are arranged in said vertical guide members in the area of said uppermost position of said platform at both sides thereof, said bale retainer means operating to engage in said bales of stalky material during deflection of said platform through said swiveling angle said bale retainer means disengaging from said bales after lowering of said platform.

10. Apparatus according to claim 9, further comprising control means for both said pivoting drive means and for said bale retainer means, said control means being coupled with each other.

* * * * *